United States Patent
Braun

(10) Patent No.: US 12,412,910 B2
(45) Date of Patent: Sep. 9, 2025

(54) THERMAL TRANSFER IN THE CATHODE PATH OF A FUEL CELL SYSTEM BY MEANS OF THE EVAPORATION/CONDENSATION OF PRODUCT WATER

(71) Applicant: Robert Bosch GmbH, Stuttgart (DE)

(72) Inventor: Jochen Braun, Heimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 529 days.

(21) Appl. No.: 18/012,332

(22) PCT Filed: Jun. 17, 2021

(86) PCT No.: PCT/EP2021/066493
§ 371 (c)(1),
(2) Date: Dec. 22, 2022

(87) PCT Pub. No.: WO2021/259767
PCT Pub. Date: Dec. 30, 2021

(65) Prior Publication Data
US 2023/0307670 A1   Sep. 28, 2023

(30) Foreign Application Priority Data
Jun. 23, 2020   (DE) .................... 10 2020 207 747.9

(51) Int. Cl.
*H01M 8/04*      (2016.01)
*H01M 8/04007*   (2016.01)
(Continued)

(52) U.S. Cl.
CPC ... *H01M 8/04059* (2013.01); *H01M 8/04014* (2013.01); *H01M 8/04111* (2013.01); *H01M 8/04201* (2013.01)

(58) Field of Classification Search
CPC ......... H01M 8/04059; H01M 8/04014; H01M 8/04111; H01M 8/04201
(Continued)

(56) References Cited

U.S. PATENT DOCUMENTS

| | | |
|---|---|---|
| 2004/0151958 A1 | 8/2004 | Formanski et al. |
| 2005/0048338 A1* | 3/2005 | Kobayashi ......... H01M 8/04119 429/492 |

(Continued)

FOREIGN PATENT DOCUMENTS

| | | |
|---|---|---|
| DE | 10225557 A1 | 12/2003 |
| DE | 102009009675 A1 | 8/2010 |

(Continued)

OTHER PUBLICATIONS

Translation of International Search Report for Application No. PCT/EP2021/066493 dated Oct. 6, 2021 (3 pages).

*Primary Examiner* — James M Erwin
(74) *Attorney, Agent, or Firm* — Michael Best & Friedrich LLP

(57) ABSTRACT

The invention relates to a fuel cell system (100), having: at least one fuel cell (101) and a cathode path (10) for providing an oxygen-containing reactant in the form of supply air (L1) to the at least one fuel cell (101), wherein the cathode path (10) has a supply air line (11) for providing the supply air (L1) to the at least one fuel cell (101) and an exhaust air line (12) for discharging exhaust air (L2) from the at least one fuel cell (101), and at least one heat exchanger (20) is provided between the supply air line (11) and the exhaust air line (12) of the cathode path (10) in order to transfer thermal energy from the supply air (L1) to the exhaust air (L2). For this purpose, the heat exchanger (20) is designed to transfer the heat to an exhaust air (L2) flow (M3) flowing through the heat exchanger (20) by means of the evaporation and (Continued)

condensation of product water (H2O) and by means of multiple supply air (L1) flows (M1, M2) flowing through the heat exchanger (20).

20 Claims, 3 Drawing Sheets

(51) Int. Cl.
    *H01M 8/04014*     (2016.01)
    *H01M 8/04082*     (2016.01)
    *H01M 8/04111*     (2016.01)

(58) Field of Classification Search
    USPC .......................................... 429/400
    See application file for complete search history.

(56) References Cited

U.S. PATENT DOCUMENTS

| | | | | |
|---|---|---|---|---|
| 2006/0251940 | A1* | 11/2006 | Bandhauer | H01M 8/04014 |
| | | | | 429/465 |
| 2008/0152976 | A1* | 6/2008 | Uehara | H01M 8/04059 |
| | | | | 429/454 |
| 2020/0168922 | A1* | 5/2020 | Weingaertner | H01M 8/04761 |

FOREIGN PATENT DOCUMENTS

| | | |
|---|---|---|
| DE | 102009014743 A1 | 9/2010 |
| DE | 102012018874 A1 | 3/2014 |
| DE | 102018213771 A1 | 2/2020 |

* cited by examiner

THERMAL TRANSFER IN THE CATHODE PATH OF A FUEL CELL SYSTEM BY MEANS OF THE EVAPORATION/CONDENSATION OF PRODUCT WATER

BACKGROUND OF THE INVENTION

The invention relates to a fuel cell system comprising at least one fuel cell and a cathode path for providing the fuel cell with an oxygen-containing reactant in the form of supply air, wherein the cathode path comprises a supply air line for providing the fuel cell with the supply air and an exhaust air line for discharging exhaust air from the fuel cell, and wherein at least one heat exchanger is provided between the supply air line and the exhaust air line to transfer thermal energy from the supply air to the exhaust air. The invention also relates to a method for operating a corresponding fuel cell system.

In drive systems with fuel cell systems, oxygen from the ambient air is generally used in order to react in the fuel cell with hydrogen to form water or water vapor and thus to obtain electrical energy. The ambient air is usually sucked in from the environment by means of one or more compressors and is provided to the fuel cell system in the form of compressed supply air by a supply air line of a cathode path. The ambient air must be compressed to ensure sufficient oxygen partial pressure for the chemical reaction. Furthermore, ambient air must be compressed in order to ensure water management (i.e. to prevent excessive dehumidification of the membranes in the fuel cell system, since warm air absorbs less water vapor at higher pressure than at lower pressure, and in order to discharge product water). Furthermore, ambient air must be compressed in order to overcome the pressure losses in the system and components, in order to ensure as homogeneous a distribution as possible across the stack. At least one compressor can be connected by means of a turbine to an exhaust air line of the cathode path in order to use a portion of the flow energy of the exhaust air by coupling into the compressor shaft. If higher operating pressures are required in the cathode path, this is associated with a correspondingly increased effort in air compression (higher outputs). This leads to increased temperatures of the compressed supply air in the cathode path. The resulting heat must be dissipated again in order to maintain the maximum permissible inlet temperatures in the stack or also in an optionally present humidifier.

SUMMARY OF THE INVENTION

According to a first aspect, the invention provides a fuel cell system configured to transfer the heat by evaporation and condensation of product water and by means of a plurality of streams of the supply air through the heat exchanger to a stream of the exhaust air through the heat exchanger. Furthermore, according to a second aspect, the invention provides a method for operating a corresponding fuel cell system. Here, features and details which are described in connection with the fuel cell system according to the invention will of course also apply in connection with the method according to the invention and vice versa, so that with respect to the disclosure of the individual aspects of the invention reference is or can be made reciprocally in all cases.

The present invention provides a fuel cell system comprising at least one fuel cell and a cathode path for providing the at least one fuel cell with an oxygen-containing reactant in the form of supply air, wherein the cathode path has a supply air line for providing the supply air to the at least one fuel cell and an exhaust air line for discharging exhaust air from the at least one fuel cell, and wherein at least one heat exchanger is provided between the supply air line and the exhaust air line of the cathode path in order to transfer thermal energy or heat from the supply air to the exhaust air, in particular to transfer it indirectly or without mass transfer between the supply air and the exhaust air. For this purpose, it is provided according to the invention that the heat exchanger is designed to transfer the heat by evaporation and condensation of product water and by means of a plurality of streams of the supply air through the heat exchanger to a stream of the exhaust air through the heat exchanger. The supply air and the exhaust air are passed through the heat exchanger without mass transfer with the product water in the heat exchanger. For this purpose, tubes are provided which are described below. The product water recirculates in the heat exchanger by evaporation at the supply air and by condensation at the exhaust air.

The fuel cell system according to the invention can be designed in the form of a fuel cell stack with a plurality of stacked repeating units in the form of individual fuel cells, preferably PEM fuel cells.

The fuel cell system according to the invention can advantageously be used for mobile applications, such as in motor vehicles, or for stationary applications, such as in generator systems.

The heat exchanger preferably transfers the heat passively and thus without auxiliary means, such as a coolant pump. Within the meaning of the invention it is also possible to dispense with an additional line system for transporting a coolant to the heat exchanger which needs to be circulated by means of the coolant pump. In mobile applications, for example in motor vehicles, this advantageously leads to relieving the load on a vehicle radiator because the heat is coupled into the exhaust air.

The heat exchanger according to the invention can be provided as a module. In addition, it is conceivable for the heat exchanger according to the invention to be provided integrated into the cathode path or into an assembly on the cathode path, such as into a compressor, in particular a turbine-driven compressor. A structural combination of the heat exchanger according to the invention with a water injection system in an assembly can also be implemented within the scope of the invention.

The concept of the invention is that the heat transfer from the supply air line into the exhaust air line is realized by water that is evaporating and condensing, preferably product water, by means of at least three media streams (two streams of the supply air and one stream of the exhaust air) or multi-media streams through the heat exchanger. However, the media streams are not in contact with the product water which serves as the working medium of the heat exchanger. The at least two or more media streams of the supply air can be guided in particular after each compressor stage in the supply air line for the purpose of cooling by the heat exchanger according to the invention. The at least two or more media streams of the supply air can advantageously effect a common transfer of the heat to the media stream of the exhaust air by means of evaporation/condensation of the product water, preferably upstream of the turbine, if present. In systems without a turbine, the heat can be coupled into the exhaust air somewhere appropriate in order to relieve the cooling circuit.

A plurality of line portions (meaning at least a first tube and a second tube) of the supply air line which are in particular fluidically sealed off from the product water run through the heat exchanger according to the invention, and one line portion (meaning a third tube) of the exhaust air line which is in particular fluidically sealed off from the product water runs through the heat exchanger according to the invention. The supply air line forms, so to speak, at least one loop through the heat exchanger, wherein two line portions of the supply air line run through the heat exchanger. In this way, the supply air can be introduced into the heat exchanger at multiple points in order to enable a gradual heat transfer to the exhaust air. The supply air can advantageously be cooled after each compressor stage.

The product water can serve as a working medium of the heat exchanger. Product water is available at multiple points in a fuel cell system and can thus be used in an advantageous manner for heat transfer using the heat exchanger according to the invention. The product water can be obtained directly from the exhaust air path of the fuel cell system. In addition, the product water can be stored temporarily in a water tank. A temporal decoupling of product water recovery and product water utilization can thereby be created.

The in particular passive heat transfer according to the invention by evaporation and condensation of product water can be advantageous in particular at high final compression temperatures, i.e. at higher cathode pressures. Recirculation of the product water takes place within the heat exchanger. The water vapor rises within the heat exchanger, condenses and drips off. The evaporation of the product water is triggered by heated supply air. By evaporating, the product water absorbs the heat from the supply air. The condensation of the product water is triggered by the cooler exhaust air. By condensing, the water vapor releases the heat to the exhaust air. The condensing water drips off and collects again in the lower part of the heat exchanger and is then again available for evaporation.

In addition, it is advantageous that the heat transfer takes place only unidirectionally (unlike passive gas/gas heat exchangers) in order to avoid undesired condensation effects.

Within the scope of the invention it is conceivable that the product water level in the heat exchanger can be regulated in order to replace the escaping water vapor with new product water. For this purpose, the heat exchanger according to the invention can have, for example, a metering valve or/and a feed pump in order to refill product water, for example from a water tank. The product water can also be replenished in a simple manner without a feed pump if the water tank is positioned above the heat exchanger. The water can be thus provided into the heat exchanger by height difference (without a pump, only a simple open/close shut-off valve).

Furthermore, it is conceivable that the heat exchanger according to the invention can be combined with further heat exchangers of the same or different type, gas/liquid or gas/gas heat exchangers, in order in particular to dissipate the residual heat.

Optionally, the invention can provide that the heat exchanger can be emptied into the water tank as required. This can be made possible by means of an outlet channel and a pump. In addition, it is conceivable that the heat exchanger can be designed to be resistant to ice pressure.

The in particular passive heat transfer according to the invention by evaporation and condensation of product water can also be advantageous in fuel cell systems with energy recuperation by means of a turbine in the exhaust air line. With the aid of the heated exhaust air, the turbine power can be increased and the electrical drive power for the air compression system can thus be reduced.

With the aid of the invention, an increased heat transfer upstream of the turbine can be effected, since two or even multiple heat sources evaporate the product water. The turbine power can thus be significantly increased. This results in a further reduction of the electrical drive power for the air compression system and/or relief of the cooling circuit(s) in the fuel cell system and/or in the vehicle.

Advantageously, the heat exchanger according to the invention does not require secondary circuit operation for an optimal heat transport from the supply air line to the exhaust air line.

The heat exchanger according to the invention is optimized in terms of installation space since the multi-stream/multi-media heat exchanger can combine a plurality of dual-stream heat exchangers.

However, the invention can also be advantageous in the case of fuel cell systems without energy recuperation, so that the cooling circuit is relieved.

The passive heat exchanger within the meaning of the invention advantageously does not require any additional integration into the cooling circuit of the end device, for example a vehicle or a generator. This increases the advantage that the heat exchanger according to the invention can be easily integrated within the fuel cell system. This also results in a further advantage that the cooling circuit of the end device can be relieved. Furthermore, no additional actuators are required, as a result of which the energy efficiency of the fuel cell system can be increased. The efficiency of the turbine can also be increased by driving the turbine with heated exhaust air.

Furthermore, in the case of a fuel cell system the invention can provide that the heat exchanger is designed drive-free in order to transfer thermal energy from the supply air to the exhaust air passively and/or indirectly without an electrical energy supply, preferably without mass transfer between the supply air and the exhaust air. Parasitic energy costs in the fuel cell system can thus be reduced and the efficiency of the fuel cell system increased.

Furthermore, in the case of a fuel cell system the invention can provide that the heat exchanger is designed to transfer thermal energy from the supply air to the exhaust air unidirectionally. Since the heat transfer direction is defined, a reversal of the heat transfer direction is advantageously not possible. In comparison with passive gas/gas heat exchangers, condensation problems in the exhaust gas duct can thus advantageously be avoided.

Furthermore, in the case of a fuel cell system the invention can provide that the heat exchanger has at least a first tube, for example in the form of a tube bundle, and a second tube, for example in the form of a tube bundle, which form two parts of the supply air line (from multiple in particular sealed inlets into the heat exchanger to multiple in particular sealed outlets from the heat exchanger), and/or in that the heat exchanger has (at least) a third tube, for example in the form of a tube bundle, which forms part of the exhaust air line (from an in particular sealed inlet into the heat exchanger to an in particular sealed outlet from the heat exchanger) which is routed through the heat exchanger. The tubes can advantageously run parallel to one another. It can thus be ensured that the flow of the oxygen-containing reactant in the supply air line and/or in the exhaust air line through the heat exchanger according to the invention can take place.

In addition, in the case of a fuel cell system the invention can provide that a first tube, a second tube and/or a third tube of the heat exchanger have/has an external surface and an internal surface, wherein the external surface has a surface area larger than the surface area of the internal surface,
and/or wherein the external surface has a ribbed structure, a lamellar structure and/or a lobed structure,
and/or wherein the external surface has a continuous, for example helical, heat transfer element or a plurality of heat transfer elements arranged at regular intervals. In this way, thermal transfer between the oxygen-containing reactant and the product water within the heat exchanger can be formed effectively via the tubes. As a result, the formation of vapor bubbles within the product water as a transfer medium can be improved on the first tube. The product water can carry the heat upwards to the second tube by evaporation. The gaseous product water condenses again on the second tube and thus releases the heat to the exhaust air. Due to the external surface on the second tube the condensation of water vapor can in turn be improved. In addition, the heat transfer element or heat transfer elements may have an inclined upper side, in particular in the flow direction of the oxygen-containing reactant, in order to promote evaporation and condensation of the product water in the direction from bottom to top or from top to bottom.

In addition, in the case of a fuel cell system the invention can provide that a first tube, a second tube and/or a third tube of the heat exchanger have (in themselves) a plurality of turns and/or a plurality of branch lines and/or a plurality of tube bundles within the heat exchanger. In this way, the degree of transfer can be set flexibly and advantageously increased as required.

Furthermore, in the case of a fuel cell system the invention can provide that the heat exchanger has a sealed housing, wherein the housing has a venting element, in particular in the form of a gas-permeable membrane, a passive valve, preferably a check valve which opens to the environment at an overpressure, or a switchable valve, and/or wherein the housing has a filling element, in particular comprising an injection point, a metering valve and/or a metering pump, wherein in particular the filling element has a control contact for open-loop and/or closed-loop control of the refilling of the product water. At higher temperatures, the water begins to evaporate. Pressure equalization with respect to the surroundings can be effected via the venting element in order not to slow down evaporation. The filling or refilling of the product water that has escaped through the venting element can be done via the filling element. The filling element can advantageously be connected to a water tank. The water tank can in turn have a metering valve and/or a metering pump or a pump/nozzle unit. A preferably electrically contactable control contact can advantageously be provided on the filling element and can be controlled e.g. by a control device. The refilling of the heat exchanger can be realized even without pump support by arranging the water tank above the heat exchanger and the refilling taking place by gravity (and optionally a shut-off valve). The removal of water or a possible emptying (e.g., in the case of a risk of frost, if the heat exchanger is not resistant to ice pressure) can be effected via a drainage point. The water can be fed back to the water tank.

In addition, in the case of a fuel cell system the invention can provide that the at least one heat exchanger has a drainage point for emptying the heat exchanger, in particular in the case of a risk of frost, wherein the heat exchanger can preferably be emptied into a water tank, and/or can provide that the at least one heat exchanger has a switchable valve, preferably an electrically contactable control contact, in particular at the drainage point. In this way, an improved functionality of the heat exchanger can be provided. In addition, the operational safety of the heat exchanger can thereby be ensured in the event of a risk of frost.

Furthermore, in the case of a fuel cell system the invention can provide that the heat exchanger is connected to a water tank, wherein the water tank is designed as a water tank of the exhaust air line, a water tank of a water injection system, a water tank of a drain line or is connected to at least one of these water tanks, and/or wherein the water tank has a discharge valve, and/or wherein the water tank is arranged above the heat exchanger. The refilling of the heat exchanger can thus be realized, in particular temporally independently of product water recovery.

In addition, in the case of a fuel cell system the invention can provide that a water injection system (with corresponding valves) is provided in the supply air line of the cathode path, wherein the heat exchanger is arranged in the supply air line of the cathode path upstream of the water injection system. The supply air can be humidified by means of the water injection system. The advantage of a water injection system is that it ensures an easily controllable regulation of the humidity of the supply air and can also contribute to the temperature adjustment of the supply air. The combination of the passive heat exchanger and the possibility of adjusting not only humidity but also temperature by means of water injection complement one another in an advantageous manner. Water injection can additionally also optimize the compression process thermodynamically.

In addition, in the case of a fuel cell system the invention can provide that a humidifier is provided between the supply air line and the exhaust air line of the cathode path, wherein the heat exchanger is arranged in the supply air line of the cathode path upstream of the humidifier and in the exhaust air line of the cathode path downstream of the humidifier. The advantage of a humidifier can be that moisture from the exhaust air can be used directly for humidifying the supply air.

Furthermore, in the case of a fuel cell system the invention can provide that a first compressor is provided in the supply air line of the cathode path, wherein the heat exchanger is arranged in the supply air line of the cathode path downstream of the first compressor. The heat exchanger can thus absorb the heat of the compressed supply air in an advantageous manner.

Furthermore, in the case of a fuel cell system the invention can provide that a first compressor and a second compressor are provided in the supply air line of the cathode path, wherein the heat exchanger is arranged in the supply air line of the cathode path downstream of the first compressor and downstream of the second compressor. In this case, the heat transfer from supply air into the exhaust air can be increased. At the same time, the compressed supply air can be cooled after each of the two compressors. Cooled air is easier to compress, and so the second compressor can be operated with improved efficiency and/or designed smaller.

In addition, in the case of a fuel cell system the invention can provide that a first compressor and a second compressor are provided in the supply air line of the cathode path, wherein the second compressor can be driven by a turbine which is provided in the exhaust air line. The turbine can advantageously be arranged downstream of the heat exchanger so that the exhaust air heated by the heat exchanger arrives at the turbine and drives the turbine efficiently.

In addition, in the case of a fuel cell system the invention can provide that a first compressor and a second compressor are provided in the supply air line of the cathode path, wherein the first compressor and the second compressor can have two separate drive shafts or a common drive shaft. Depending on the design and/or depending on the installation space available, a suitable structure of the fuel cell system can thus be provided.

Furthermore, in the case of a fuel cell system the invention can provide that the first compressor is designed as a multi-stream or multi-stage compressor, and/or that the first compressor has two individual compressors which can have two separate drive shafts or a common drive shaft. As a result, the degree of compression of the supply air can be increased. The structure of the fuel cell system can also be designed flexibly as a result.

Furthermore, in the case of a fuel cell system the invention can provide that at least one further heat exchanger of any type is arranged in the supply air line of the cathode path, for example after each pass through the heat exchanger, and this can be connected, for example, to a cooling circuit of a vehicle. The efficiency of heat transfer can thus be increased.

The present invention provides a method for operating a fuel cell system, comprising at least one fuel cell and a cathode path for providing an oxygen-containing reactant in the form of supply air into the at least one fuel cell, wherein the cathode path has a supply air line for providing the supply air to the at least one fuel cell and an exhaust air line for discharging exhaust air from the at least one fuel cell, and wherein at least one heat exchanger is provided between the supply air line and the exhaust air line of the cathode path in order to transfer thermal energy from the supply air to the exhaust air. For this purpose, it is provided according to the invention that the heat exchanger transfers the heat by evaporation and condensation of product water and by means of a plurality of streams of supply air through the at least one heat exchanger to a stream of exhaust air. The method according to the invention achieves the same advantages as were described above using the fuel cell system according to the invention. These advantages are referred to in full in the present case.

BRIEF DESCRIPTION OF THE DRAWINGS

The invention, its developments and their advantages are explained in more detail below with reference to the drawings. In the drawings, in each schematically.

In the different figures, the same parts of the invention are always provided with the same reference numbers, which is why they are usually only described once.

DETAILED DESCRIPTION

Figure 1:
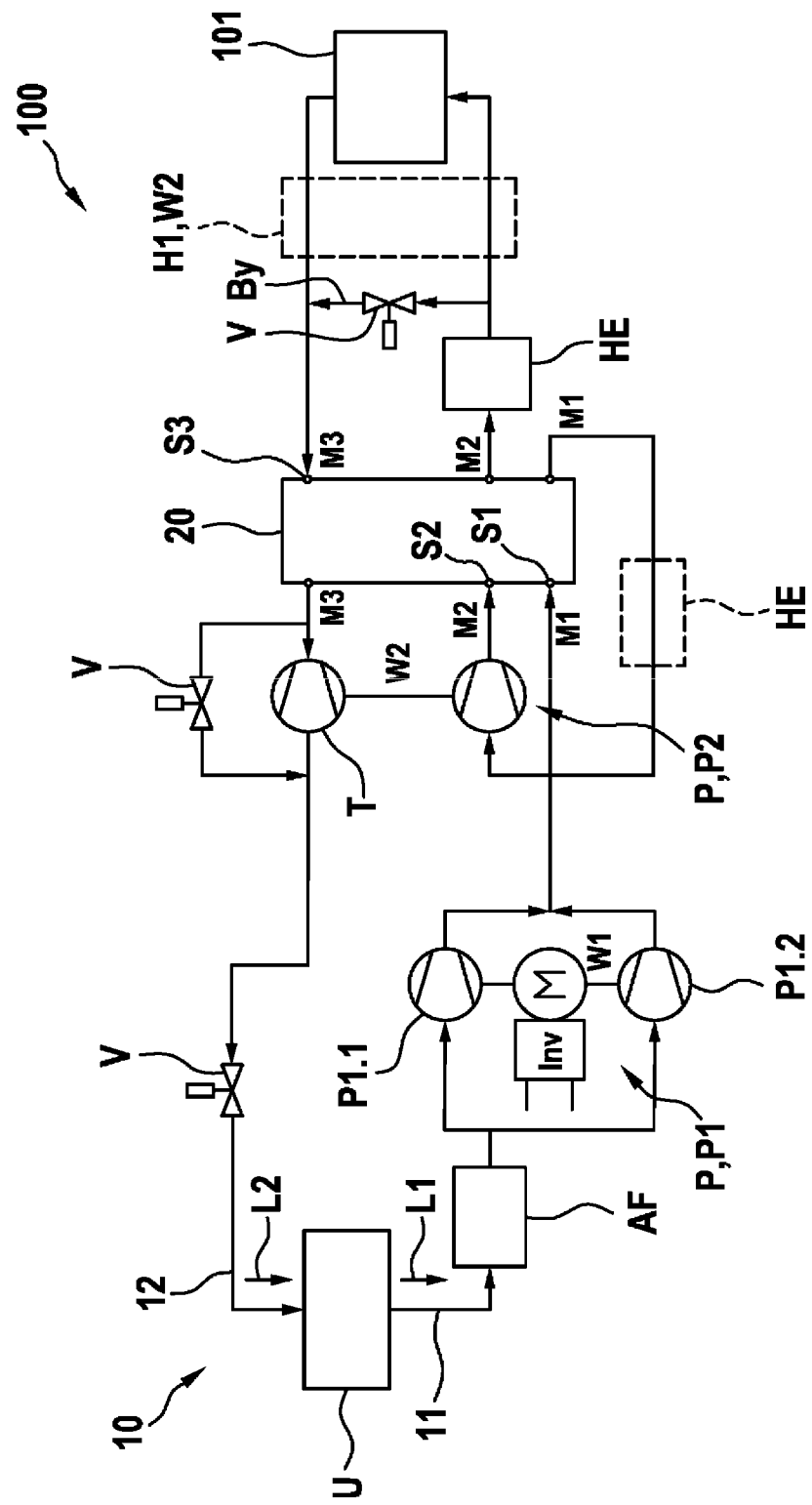
FIG. 1 is a schematic representation of a fuel cell system within the meaning of the invention.

FIG. 1 shows a fuel cell system 100 within the meaning of the invention. The fuel cell system 100 can have at least one fuel cell 101 or a plurality of fuel cells 101, preferably PEM fuel cells, assembled into a stack. The fuel cell system 100 according to the invention according to FIG. 1 can be used for mobile applications, such as in motor vehicles, or for stationary applications, such as in generator systems.

In addition, the fuel cell system 100 according to the invention has a cathode path 10 for providing an oxygen-containing reactant in the form of supply air to the at least one fuel cell 101. The cathode path 10 has a supply air line 11 for providing the supply air to the at least one fuel cell 101 and an exhaust air line 12 for discharging exhaust air from the at least one fuel cell 101. An air filter AF can be provided at the input of the supply air line 11 of the cathode path 10 in order to filter the ambient air in accordance with the requirements of the fuel cell 101. A heat exchanger 20 is provided between the supply air line 11 and the exhaust air line 12 of the cathode path 10 in order to transfer thermal energy or heat from the supply air to the exhaust air (unidirectionally) by means of the evaporation/condensation of the product water H2O and by means of a plurality of streams M1, M2 of the supply air L1 through the heat exchanger 20 to a stream M3 of the exhaust air L2, in particular to transfer it indirectly or without mass transfer between the supply air and the exhaust air.

The heat exchanger 20 according to the invention is designed to transfer the heat from the supply air line 11 into the exhaust air line 12 by evaporating and condensing product water by means of at least three media streams M1, M2, M3 (two streams M1, M2 of the supply air L1 and one stream M3 of the exhaust air L2) or even more media streams through the heat exchanger 20. After each compressor stage in the supply air line 11, the at least two or more media streams M1, M2 of the supply air L1 can be passed through the heat exchanger 20 according to the invention in order to cool the supply air L1 gradually. The at least two or more media streams M1, M2 of the supply air L1 can advantageously provide a common transfer of the heat by means of the heat exchanger 20 to the media stream M3 of the exhaust air L2, preferably upstream of a turbine T.

A plurality of line portions (meaning at least a first tube R1 and a second tube R2) of the supply air line 11 which are in particular fluidically sealed off from the product water H2O run through the heat exchanger 20 according to the invention, and one line portion (meaning a third tube R3) of the exhaust air line 12 which is in particular fluidically sealed off from the product water H2O runs through the heat exchanger according to the invention. In the heat exchanger 20, the product water is transported passively and thus without auxiliary means, such as a coolant pump KMP. It is also possible in principle to dispense with an additional line system KML for transporting a coolant which is circulated by means of the coolant pump KMP, as well as a separate heat exchanger HE in the fuel cell system 100 according to the invention. One or two smaller heat exchangers HE can optionally be retained in the supply air line 11, which is/are only optionally switched on for example to dissipate the remaining waste heat after the flow through the heat exchanger 20 according to the invention. In mobile applications, for example in motor vehicles, this can advantageously lead to relieving the load on a vehicle radiator (not shown).

Figure 2:
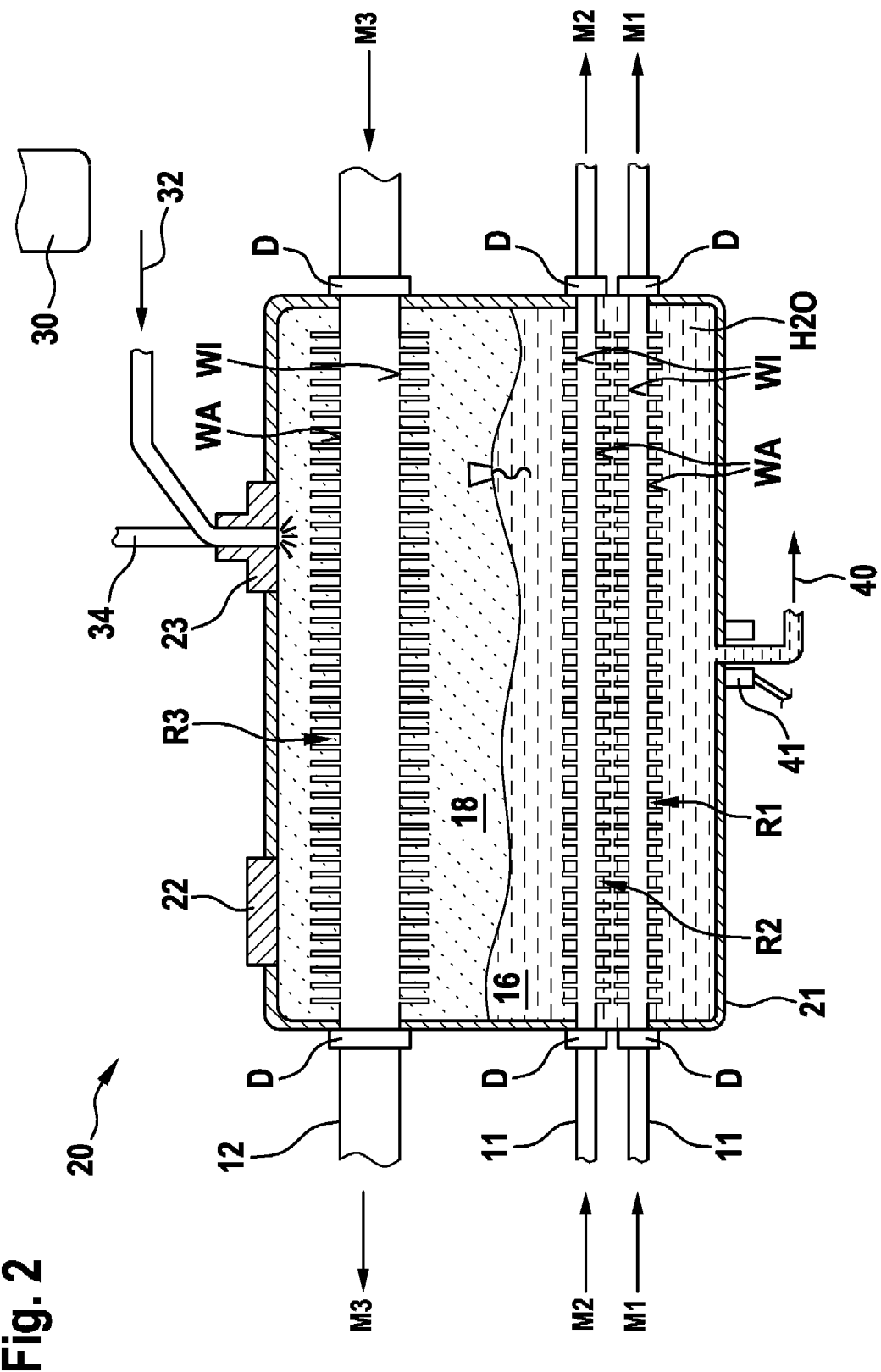
FIG. 2 is a schematic representation of a heat exchanger within the meaning of the invention.

As shown in FIG. 2, the heat exchanger 20 within the meaning of the invention has a first tube R1 and a second tube R2, which form two parts of the supply air line 11 from two inputs into the heat exchanger 20, which are sealed for example by means of corresponding seals D, in each case to two outlets from the heat exchanger 20, which are for example sealed by corresponding seals D. In addition, the heat exchanger 20 has a third tube R3 which forms part of the exhaust air line 12 from an inlet, which is sealed e.g. by a seal D, into the heat exchanger 20 to an outlet B2, which is sealed e.g. by a seal D, from the heat exchanger 20.

As shown in FIG. 2, the tubes R1, R2, R3 of the heat exchanger 20 can have an external surface WA and an internal surface WI. The external surface WA has a surface area larger than the surface area of the internal surface WI. The external surface WA can have a ribbed structure, a lamellar structure and/or a lobed structure. The external surface WA can have a continuous, for example helical, heat transfer element or a plurality of heat transfer elements arranged at regular intervals. Furthermore, the heat transfer element or the heat transfer elements may have an inclined upper side, in particular in the flow direction of the oxygen-containing reactant, in order not to impede the evaporation and condensation of the product water H2O. In addition, it is conceivable for the tubes R1, R2, R3 of the heat exchanger 20 to have a plurality of turns U1, U2 and/or a plurality of branch lines L and/or in other words a plurality of tube bundles.

As also shown in FIG. 2, the heat exchanger 20 has a sealed housing 21 in which the product water H2O as the working medium is accommodated. At the bottom in contact with the first tube R1 and with the second tube R2, the product water H2O is in the liquid state 16 and absorbs heat from the heated compressed supply air L1 in the supply air line 11 through the material of the first tube R1. At the top in contact with the second tube R2, the product water H2O is in the gaseous state 18. There it condenses on the second tube R2 and transfers heat through the material of the second tube to the exhaust air in the exhaust air line 12. The product water H2O recirculates within the heat exchanger 20 by evaporation and condensation and thus by convection of the product water H2O which is present within the heat exchanger 20 in two states, liquid and gaseous.

As also shown in FIG. 2, the housing 21 can have a venting element 22, which can be designed, for example, in the form of a gas-permeable membrane, a passive valve, preferably a check valve which opens to the environment at an overpressure, or a switchable valve, in order to adjust pressure within the housing 21. Pressure adjustment can be achieved by the water vapor being able to escape from the housing 21 through the venting element 22. The venting element 22 can thus ensure that an optimum pressure for the evaporation of product water H2O prevails within the housing 21. The venting element 22 can advantageously be designed to be controllable in an open and/or closed loop.

As also shown in FIG. 2, the housing 21 can have a filling element 23 which, for example, has an injection point, a metering valve and/or a metering pump. As also indicated in FIG. 2, a control contact 34 can be provided at the filling element 23 for open-loop and/or closed-loop control of the refilling of the product water H2O.

The principle of the heat exchanger 20 within the meaning of the invention and of FIG. 2 can be explained as follows. At higher temperatures, the product water H2O begins to evaporate within the housing 21 of the heat exchanger 20 on the external surface WA of the first tube R1 and of the second tube R2. The water vapor rises within the heat exchanger 20 and condenses on the cooler third tube R3 and thereby releases the heat to the third tube R3 and then to the exhaust air. The condensing product water H2O drips off within the heat exchanger 20 and collects again in the lower part of the housing 21 (liquid phase) and is again available for evaporation.

As a result, passive recirculation of the product water H2O within the heat exchanger 20 takes place. By means of the venting element 22, pressure equalization with respect to the environment can take place in order not to slow down the evaporation. The filling or refilling of the product water H2O, which has escaped through the venting element 22, can be done via the filling element 23.

The filling element 23 can be connected e.g. to a schematically indicated water tank 30. The water tank 30 can in turn have a metering valve and/or a metering pump or a pump/nozzle unit.

A preferably electrically contactable control contact 24 can advantageously be provided on the filling element 23 and can be controlled e.g. by a control device (a control device of the fuel cell system 100 or of the vehicle, not shown).

In principle, the refilling of the heat exchanger 20 can also take place without pump support. For this purpose, the water tank 30 can be arranged above the heat exchanger 20 in order to realize the refilling by means of gravity (and optionally a shut-off valve).

The removal of water or a possible emptying of the heat exchanger 20 (for example in the event of a risk of frost if the heat exchanger 20 is not designed to be resistant to ice pressure) can be effected via a drainage point 40. The discharged product water H2O can be fed back to the water tank 30. A switchable valve 41, preferably an electrically contactable control contact 41, can likewise be provided at the discharge point 40 in order to control the emptying of the heat exchanger 20.

Furthermore, it is conceivable for the control device (not shown), which has already been mentioned above, to control the venting element 22 and/or the control contacts 34, 41 in a coordinated manner. It is also conceivable that a control loop can be created with the aid of the venting element 22 and/or the control contacts 34, 41. For this purpose, the pressure within the housing 21, the product water level or the like within the housing 21 can be monitored, for example by means of appropriate sensors.

Furthermore, it is conceivable within the scope of the invention for the water tank 30 to be designed as a water tank of the exhaust air line 12, a water tank of a water injection system W2, a water tank of a drain line (not shown) of the fuel cell system 100 or the like, or to be connected to at least one of these water tanks.

Within the scope of the invention it is conceivable that a bypass By, a humidifier H1 or a water injection system W2 can be provided between the supply air line 11 and the exhaust air line 12 of the cathode path 10. Furthermore, valves V can be provided at the outlet of the exhaust air line 12 and/or in the bypass line around the turbine T.

Within the scope of the invention, it is also conceivable that at least one first compressor P1 can be provided in the supply air line 11 of the cathode path 10, wherein the heat exchanger 20 is arranged in the supply air line 11 of the cathode path 10 downstream of the first compressor P1.

In the context of the invention, it is also conceivable that a first compressor P1 and a second compressor P2 can be provided in the supply air line 11 of the cathode path 10, wherein the heat exchanger 20 can be arranged in the supply air line 11 of the cathode path 10 downstream of the first compressor P1 and downstream of the second compressor P2.

The second compressor P2 can preferably be driven by a turbine T which is provided in the exhaust air line 12. The turbine T can advantageously be arranged downstream of the heat exchanger 20, so that the exhaust air L2 heated by the heat exchanger 20 arrives at the turbine T and drives the turbine T efficiently.

Furthermore, in the case of a fuel cell system 100 the invention can provide that the first compressor P1 and the second compressor P2 according to FIG. 1 can have two separate drive shafts W1, W2 (cf. FIG. 1) or a common drive shaft.

Furthermore, it is conceivable that the first compressor P1 can be designed as a multi-stream or multi-stage compressor (cf. FIG. 1) and/or can have two individual compressors P1.1, P1.2, which in turn can have two separate drive shafts or a common drive shaft W1.

Figure 3:
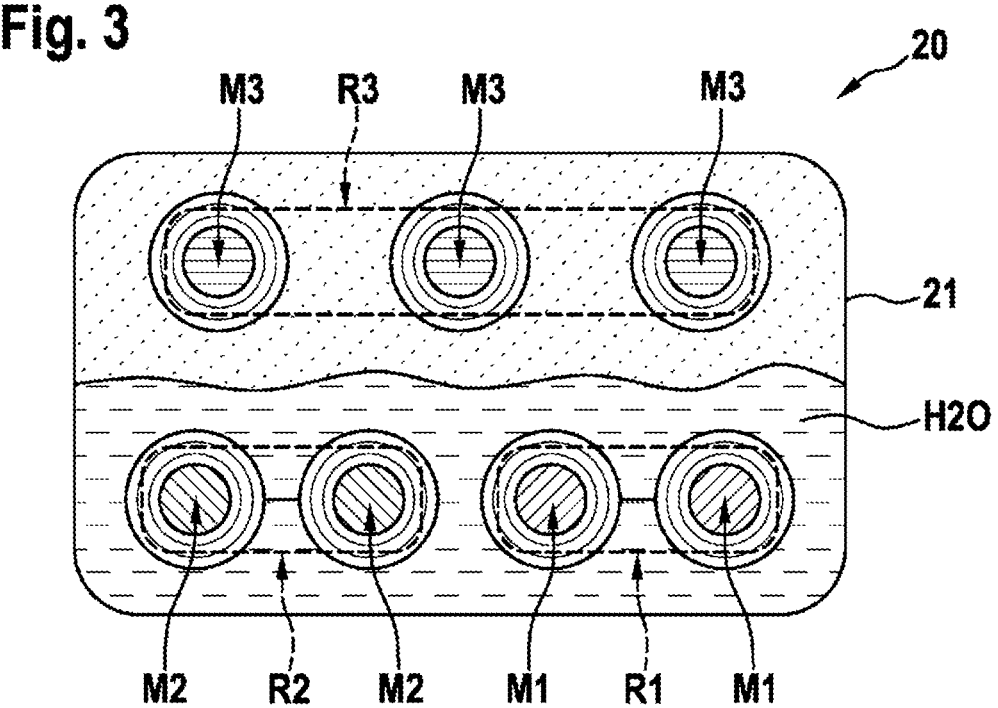
FIG. 3 is a schematic cross-section of a heat exchanger within the meaning of the invention.
Figure 4:
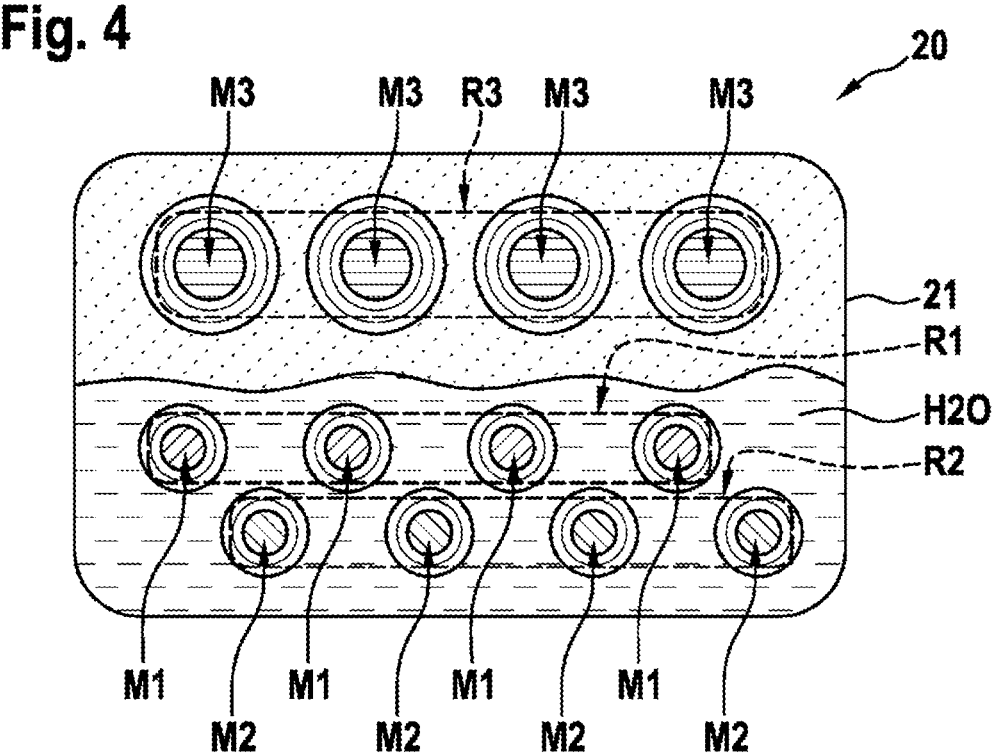
FIG. 4 is a schematic cross-section of a heat exchanger within the meaning of the invention.

As also shown in FIGS. 3 and 4, the tubes R1, R2 for conducting the supply air L1 through the heat exchanger 20 and the tube R3 for conducting the exhaust air L2 through the heat exchanger 20 can each be designed as distributors and/or as multiple lines and/or collecting lines and/or tube bundles. Shown in FIG. 3 by way of example are two double tubes R1, R2 for the streams M1, M2 of the supply air L1 and a triple tube R3 for the stream M3 of the exhaust air L2. FIG. 3 shows, by way of example, two quadruple tubes R1, R2 for the streams M1, M2 of the supply air L1 and a quadruple tube R3 for the stream M3 of the exhaust air L2.

The above description of the figures describes the present invention exclusively in the context of examples. Of course, individual features of the embodiments, provided it makes technical sense, can be freely combined with one another without departing from the scope of the invention.

What is claimed is:

1. A fuel cell system (100), comprising:
   at least one fuel cell (101),
   and a cathode path (10) for providing the at least one fuel cell (101) with an oxygen-containing reactant in the form of supply air (L1),
   wherein the cathode path (10) comprises
   a supply air line (11) for providing the at least one fuel cell (101) with the supply air (L1),
   and an exhaust air line (12) for discharging exhaust air (L2) from the at least one fuel cell (101),
   and wherein at least one heat exchanger (20) is provided between the supply air line (11) and the exhaust air line (12) of the cathode path (10) to transfer thermal energy from the supply air (L1) to the exhaust air (L2),
   characterized in that
   the heat exchanger (20) is configured to transfer the heat by evaporation and condensation of product water (H2O) and by means of a plurality of streams (M1, M2) of the supply air (L1) through the heat exchanger (20) to a stream (M3) of the exhaust air (L2) through the heat exchanger (20).

2. The fuel cell system (100) according to claim 1, characterized in that
   a plurality of line portions of the supply air line (11) run through the heat exchanger (20) and one line portion of the exhaust air line (12) runs through the heat exchanger.

3. The fuel cell system (100) according to claim 1, characterized in that
   the heat exchanger (20) is configured to be drive-free to transfer thermal energy from the supply air (L1) to the exhaust air (L2) passively and/or indirectly without an electrical energy supply,
   and/or in that the heat exchanger (20) is configured to transfer thermal energy from the supply air (L1) to the exhaust air (L2) unidirectionally.

4. The fuel cell system (100) according to claim 1, characterized in that
   the heat exchanger (20) has at least a first tube (R1) and a second tube (R2) which form two parts of the supply air line (11) which are routed through the heat exchanger (20),
   and/or in that the heat exchanger (20) has a third tube (R3) which forms a part of the exhaust air line (12) which is routed through the heat exchanger (20).

5. The fuel cell system (100) according to claim 1, characterized in that
   a first tube (R1), a second tube (R2) and/or a third tube (R3) of the heat exchanger (20) has/have an external surface (WA) and an internal surface (WI),
   wherein the external surface (WA) has a surface area larger than the surface area of the internal surface (WI),
   and/or wherein the external surface (WA) has a ribbed structure, a lamellar structure and/or a lobed structure,
   and/or wherein the external surface (WA) has a continuous, for example helical, heat transfer element or a plurality of heat transfer elements arranged at regular intervals.

6. The fuel cell system (100) according to claim 1, characterized in that
   a first tube (R1), a second tube (R2) and/or a third tube (R3) of the heat exchanger (20) has a plurality of turns (U1, U2) and/or a plurality of branch lines (L) and/or a plurality of tube bundles.

7. The fuel cell system (100) according to claim 1, characterized in that
   the heat exchanger (20) has a sealed housing (21),
   wherein the housing (21) comprises a venting element (22),
   and/or wherein the housing (21) has a filling element (23).

8. The fuel cell system (100) according to claim 1, characterized in that
   the at least one heat exchanger (20) has a drainage point (40) for emptying the heat exchanger (20),
   and/or in that the at least one heat exchanger (20) has a switchable valve (41).

9. The fuel cell system (100) according to claim 1, characterized in that
   the heat exchanger (20) is connected to a water tank (30),
   wherein the water tank (30) is configured as a water tank of the exhaust air line (12), a water tank of a water injection system (W2), a water tank of a drain line or is connected to at least one of these water tanks,
   and/or wherein the water tank (30) has a discharge valve (31), and/or wherein the water tank (30) is arranged above the heat exchanger (20).

10. The fuel cell system (100) according to claim 1, characterized in that
    a first compressor (P1) and a second compressor (P2) are provided in the supply air line (11) of the cathode path (10),
    wherein the second compressor (P2) can be driven by a turbine (T) provided in the exhaust air line (12),
    and wherein the turbine (T) is arranged in the exhaust air line (12) downstream of the heat exchanger (20).

11. The fuel cell system (100) according to claim 1, characterized in that
    a plurality of line portions of the supply air line (11) which are fluidically sealed off from the product water (H2O) run through the heat exchanger (20) and one line portion of the exhaust air line (12) which is fluidically sealed off from the product water (H2O) runs through the heat exchanger.

12. The fuel cell system (100) according to claim 11, characterized in that the heat exchanger (20) is configured to be drive-free to transfer thermal energy from the supply air (L1) to the exhaust air (L2) passively and/or indirectly without an electrical energy supply, without mass transfer, and/or in that the heat exchanger (20) is configured to transfer thermal energy from the supply air (L1) to the exhaust air (L2) unidirectionally.

13. The fuel cell system (100) according to claim 12, characterized in that the heat exchanger (20) has at least a first tube (R1) and a second tube (R2) which form two parts of the supply air line (11) which are routed through the heat exchanger (20), and/or in that the heat exchanger (20) has a third tube (R3) which forms a part of the exhaust air line (12) which is routed through the heat exchanger (20).

14. The fuel cell system (100) according to claim 13, characterized in that a first tube (R1), a second tube (R2) and/or a third tube (R3) of the heat exchanger (20) has/have an external surface (WA) and an internal surface (WI), wherein the external surface (WA) has a surface area larger than the surface area of the internal surface (WI), and/or wherein the external surface (WA) has a ribbed structure, a lamellar structure and/or a lobed structure, and/or wherein the external surface (WA) has a continuous, for example helical, heat transfer element or a plurality of heat transfer elements arranged at regular intervals, wherein the heat transfer element or the heat transfer elements have an inclined upper side, in the flow direction of the oxygen-containing reactant, in order to favor the evaporation and condensation of the product water.

15. The fuel cell system (100) according to claim 14, characterized in that a first tube (R1), a second tube (R2) and/or a third tube (R3) of the heat exchanger (20) has a plurality of turns (U1, U2) and/or a plurality of branch lines (L) and/or a plurality of tube bundles.

16. The fuel cell system (100) according to claim 15, characterized in that the heat exchanger (20) has a sealed housing (21), wherein the housing (21) comprises a venting element (22), in the form of a gas-permeable membrane, a passive valve, a check valve which opens to the environment at an overpressure, or a switchable valve, and/or wherein the housing (21) has a filling element (23), comprising an injection point, a metering valve and/or a metering pump, wherein the filling element (23) has a control contact (34) for open-loop and/or closed-loop control of the refilling of the product water (H2O).

17. The fuel cell system (100) according to claim 16, characterized in that the at least one heat exchanger (20) has a drainage point (40) for emptying the heat exchanger (20), in the event of a risk of frost, the heat exchanger being able to be emptied into a water tank (30), and/or in that the at least one heat exchanger (20), at the drainage point (40), has a switchable valve (41) including an electrically contactable control contact.

18. The fuel cell system (100) according to claim 17, characterized in that the heat exchanger (20) is connected to a water tank (30), wherein the water tank (30) is configured as a water tank of the exhaust air line (12), a water tank of a water injection system (W2), a water tank of a drain line or is connected to at least one of these water tanks, and/or wherein the water tank (30) has a discharge valve (31), and/or wherein the water tank (30) is arranged above the heat exchanger (20).

19. The fuel cell system (100) according to claim 18, characterized in that a first compressor (P1) and a second compressor (P2) are provided in the supply air line (11) of the cathode path (10), wherein the second compressor (P2) can be driven by a turbine (T) provided in the exhaust air line (12), and wherein the turbine (T) is arranged in the exhaust air line (12) downstream of the heat exchanger (20).

20. The fuel cell system (100) according to claim 16, characterized in that the heat exchanger (20) has a sealed housing (21), wherein the housing (21) comprises a venting element (22) in the form of a gas-permeable membrane, a passive valve, or a switchable valve, and/or wherein the housing (21) has a filling element (23).

* * * * *